United States Patent
Lu

(10) Patent No.: US 9,995,956 B2
(45) Date of Patent: Jun. 12, 2018

(54) INTEGRATED FULLY-SEALED LIQUID CRYATAL SCREEN AND MANUFACTURING PROCESS FOR SAME

(71) Applicant: OPTON (SHUNCHANG) OPTICS CO., LTD, Fujian (CN)

(72) Inventor: Zhang Lu, Fujian (CN)

(*) Notice: Subject to any disclaimer, the term of this patent is extended or adjusted under 35 U.S.C. 154(b) by 0 days. days.

(21) Appl. No.: 15/538,666

(22) PCT Filed: Mar. 18, 2016

(86) PCT No.: PCT/CN2016/076665
§ 371 (c)(1),
(2) Date: Jun. 22, 2017

(87) PCT Pub. No.: WO2016/150338
PCT Pub. Date: Sep. 29, 2016

(65) Prior Publication Data
US 2018/0004028 A1    Jan. 4, 2018

(30) Foreign Application Priority Data
Mar. 20, 2015   (CN) .......................... 2015 1 0123518

(51) Int. Cl.
*G02F 1/1333*   (2006.01)
*G02F 1/1339*   (2006.01)
(Continued)

(52) U.S. Cl.
CPC ....... *G02F 1/13338* (2013.01); *G02B 6/0051* (2013.01); *G02B 6/0053* (2013.01);
(Continued)

(58) Field of Classification Search
None
See application file for complete search history.

(56) References Cited

U.S. PATENT DOCUMENTS

| 4,715,686 A * | 12/1987 | Iwashita | G02F 1/1333 349/122 |
| 2012/0182701 A1* | 7/2012 | Weatherspoon | H05K 1/189 361/750 |

(Continued)

FOREIGN PATENT DOCUMENTS

CN    101359267 A    2/2009

*Primary Examiner* — Ryan Crockett
(74) *Attorney, Agent, or Firm* — Prakash Nama; Global IP Services, PLLC

(57) ABSTRACT

A manufacturing process for an integrated fully-sealed liquid crystal screen is disclosed. Components sequentially arranged are adhered to each other into a whole by a solid ultraviolet flexible adhesive, the components comprising a screen protecting glass, a liquid crystal screen set, a support frame and a rear glass cover plate and an edge lighting type backlight module being nested in the support frame. The touch and display integrated screen manufactured by the process is fully-sealed, waterproof, damp-proof and ultra-thin, all gaps of the screen protecting glass or the touch screen set, a liquid crystal display screen set and the side lighting type backlight module are eliminated, the image definition is improved, and also the brightness can be reduced to achieve a remarkable energy-saving effect.

14 Claims, 2 Drawing Sheets

(51) Int. Cl.
*F21V 8/00* (2006.01)
*G06F 3/041* (2006.01)
*G06F 3/044* (2006.01)

(52) U.S. Cl.
CPC ......... *G02B 6/0055* (2013.01); *G02B 6/0065* (2013.01); *G02F 1/1339* (2013.01); *G02F 1/133308* (2013.01); *G06F 3/044* (2013.01); *G06F 3/0412* (2013.01); *G02F 2001/133311* (2013.01); *G02F 2001/133331* (2013.01); *G02F 2202/22* (2013.01); *G02F 2202/28* (2013.01); *G06F 2203/04103* (2013.01)

(56) References Cited

U.S. PATENT DOCUMENTS

| | | | |
|---|---|---|---|
| 2012/0218640 A1* | 8/2012 | Gollier | C03C 15/00 359/609 |
| 2015/0092141 A1* | 4/2015 | Peng | G02F 1/133528 349/96 |
| 2018/0039138 A1* | 2/2018 | Iida | G02F 1/133528 |

* cited by examiner

INTEGRATED FULLY-SEALED LIQUID CRYATAL SCREEN AND MANUFACTURING PROCESS FOR SAME

BACKGROUND OF THE INVENTION

The present invention relates to the technical field of touch screen, and more specifically relates to an integrated fully sealed and anti-interference touch LCD screen and a method of manufacturing the same.

Typically, adherence between large transparent glasses is achieved by first applying liquid UV optical adhesive to a surface of a piece of glass, allowing the optical adhesive to flow and distribute evenly on the glass surface, and then placing another piece of glass which has no adhesive thereon over and near to the glass applied with adhesive, and aligning their top sides, after that, pressing the two pieces of glass together by rolling a roller over the glass without adhesive to expel gas and bubbles in the liquid UV optical adhesive out of the adhered glass body, finally illuminating the transparent adhered glass body from a top side of the transparent adhered glass body by a high power UV light to solidify the UV optical adhesive and achieve adherence. However, the equipment for applying the UV optical adhesive is expensive. Also, during bubble elimination, the UV optical adhesive may be distributed over the glass surface with varied thicknesses because the UV optical adhesive flows over the glass surface by pressing force from a roller the rolls towards a single direction, thereby always leaving unwanted bubbles inside the adhesive. As a result, mura effect may happen (similar to moire patterns). Further, the UV optical adhesive may easily overthrow to the gaps at the edge-lighting backlight module, thereby increasing the product defective rate. Besides, since large adhesive applying equipment is very expensive, defective products due to incomplete bubble elimination or mura effect will lead to the increase in production cost.

CN102609134 (application no. 201210011775.X) discloses a method for controlling overflow of liquid optical adhesive during adhesion, comprising the following steps: (1) gluing panel glass of a capacitive touch screen and sensing circuits by liquid optical adhesive; (2) wrapping the touch screen with a protecting film; (3) placing the touch screen in a bubble elimination device and then increasing the pressure of the bubble elimination device; and (4) taking the touch screen out and removing the protecting film after pressure relief of the bubble elimination device. The above technique is complicated. Also, bubbles are eliminated by pressurized centrifugal rotation which is susceptible of distributing the optical adhesive with varied thicknesses; the pressures and temperatures at different positions of a display screen during adhesion may be more significantly different in a display screen with larger surface area than in a display screen with smaller surface area (e.g. a mobile phone display screen). Hence, a display screen with larger surface area may develop moire patterns more easily. Besides, the larger the screen is, the longer the distance is which the centrifugal force has to cover, and thus the harder it is to eliminate the bubbles. Therefore, it is not practicable to use a gigantic rotary bubble elimination machine to achieve bubble elimination of a large touch screen.

CN103407276 (application no. 201310379842.8) discloses a method of using a solid optically clear adhesive (OCA) for adhesion between a small mobile phone touch screen and an upper polarizer. A polarizer is an optical film which is soft, and so a solid OCA can be used as an adhesive agent for adhering the soft polarizer with the hard touch screen. However, the use of solid OCA to adhere hard touch screen and hard LCD does not allow bubble elimination by pressing and rolling. Also, OCA will not flow as it solidifies immediately upon adhesion. Therefore, when OCA is pressurized and heated by using an autoclave, varied thicknesses may be resulted, thereby leading to defective product having mura effect. The larger the display screen is, the more serious the mura effect will be, and the lower the product yield rate is therefore resulted.

On the other hand, a currently available LCD screen uses a frame structure to assemble and support the display screen, and a protective glass is adhered onto the frame. With respect to a 1 mm thick LCD assembled using liquid crystal glass, the LCD is more susceptible to break and thus hurt a user as its surface area increases. Therefore, protective glass is required. The protective glass is usually adhered to the frame. Specifically, double-sided tapes are adhered to the four sides of the protective glass so that the protective glass can be adhered to the frame of the LCD screen. However, the frame structure thickens the screen and creates a gap. Image quality deteriorates due to the gap, and the two pieces of glasses between the gap will easily develop mold and moisture on the surfaces but the glasses cannot be wiped and cleaned. Further, large protective glass is heavier and easier to fall off. Besides, metal support back panel is often used to fix the LCD screen to prevent the screen from being broken during transport or during use. Heavier back panel has to be used to avoid deformation of larger LCD screen. As such, according to the structure of the current LCD screen, the larger and heavier backlight panel outer cover, metal heat dissipation support panel, LCD screen back panel and display screen outer shell, used for supporting, protecting or complimenting the LCD screen, will have to be used for larger LCD screen. As a result, the overall thickness of the display screen will be thicker.

BRIEF SUMMARY OF THE INVENTION

It is an object of the present invention to provide a manufacturing method of an integrated fully-sealed liquid crystal screen which involves simple techniques and achieves complete adhesion effect. The liquid crystal screen being manufactured is also super thin.

A manufacturing method of an integrated fully-sealed liquid crystal screen, using solid UV flexible adhesives to adhere components that are arranged in sequence to form an integrated structure; said components comprise and are arranged in a sequence of a screen protective material being a touch screen module or a screen protective glass, a liquid crystal screen module, a supporting frame and a glass rear cover panel; the method comprises the following steps:

1. Preliminary attaching: attaching solid UV flexible adhesives which form a thickness of 50-300 μm between every two adjacent components, and embedding an edge-lighting backlight module directly in the supporting frame;

2. Eliminating bubbles: placing the components attached with the solid UV flexible adhesives into an autoclave for 10-250 mins to eliminate bubbles, with pressure and temperature inside the autoclave maintained at 0.5-10 kg and 30-65° C. respectively; compared with an ordinary procedure of vacuum centrifugal bubble elimination, the use of autoclave to eliminate bubbles allows even pressure distribution on panel board elements, and ensures stable bubble elimination process as well as even thickness of the solid UV flexible adhesives so that a distance between two adhered transparent components is the same and bubble elimination effect is satisfactory;

3. Solidifying: illuminating the components attached by the solid UV flexible adhesives using a high power UV light to solidify the solid UV flexible adhesives in order to be adhered with the components;

4. Sealing edges: abrading and polishing edges of the integrated structure; coating the edges of the integrated structure with transparent sealer coating; and then drying the integrated structure. Since an allowance appears between the glass and the supporting frame after adhesion, the edges of the integrated structure are sealed thanks to the capability of these two components to be abraded and polished; reinforced sealing operation is performed at parts of the edges of the integrated structure which are most susceptible to moisture and oxidation. Since the integrated structure does not contain a decorative supporting frame, the manufacturing cost can be reduced.

In order to achieve better technical effect, the present invention as discussed above can be modified as follows:

1. The supporting frame is made of organic panel glass, antioxidant resin board or metal board.

2. In said step 1, a bottom reflector sheet and a light guiding panel of the edge-lighting backlight module are adhered to an inner side of the glass rear cover panel by using the solid UV flexible adhesives; one or two sides of the light guiding panel is/are provided with a light source; and then the glass rear cover panel is adhered to the supporting frame; an upper protective sheet, a prism sheet and a diffuser sheet of the edge-lighting backlight module are embedded in the supporting frame. By separately installing the parts making up the edge-lighting backlight module part by part, heat energy of the light can be directly dissipated through the supporting frame and the glass panel, thereby lengthening the service life of the present invention. As the bottom reflector sheet and the light guiding panel are adhered together, gap is eliminated, thereby reducing the loss of light and in turns creating a brighter effect. After adhesion, a cover panel with an inverted T shape is formed, thereby increasing the positioning accuracy for adhesion. Also, the cover panel with such inverted T shape can flatten and press tightly against an optical sheet embedded in the supporting frame.

3. The supporting frame has an arc shape. In said step 1, attaching the touch screen module with the liquid crystal screen module and the glass, rear cover panel with the backlight module, and then embedding the liquid crystal screen module which is behind the touch screen module and the backlight module which is positioned in front of the glass rear cover panel into the supporting frame which has an arc shape. As such, the attached components form an arc shape in general. Since the touch screen module, the liquid crystal screen module, the backlight module and the glass rear cover panel are flexible in nature, their attachment with the arc-shaped supporting frame can eventually form an arc-shaped display screen.

4. The glass rear cover panel can guide light, the glass rear cover panel which can guide light can be treated as the light guiding panel of the edge-lighting backlight module; the glass rear cover panel which can guide light is embedded into the supporting frame and being adhered and fixed to the supporting frame; one or two sides of the glass rear cover panel is/are provided with a light source on the supporting frame; the bottom reflector sheet of the edge-lighting backlight module is printed or adhered to an outer side of the glass rear cover panel; the screen becomes even lighter and thinner when the glass rear cover panel which can guide light is used in lieu of a commonly used acryl light guiding panel of the edge-lighting backlight module.

The inventive concept of the present invention is its complete adhesion technique achieved by the use of solid UV flexible adhesives the adhesive agent and also the use of an autoclave for bubble elimination. Compared with liquid UV optical adhesives and solid OCA, solid UV flexible adhesives possess a better ability to flow in a solid state. Also, when the solid UV flexible adhesives are manufactured into a rolled sheet, all the bubbles inside are filtered and eliminated, and such solid UV flexible adhesives being a kind of bubble-less adhesive agent are attached in a solid state between two transparent panel board elements during use. After pressurization and heating inside the autoclave, the flexible solid adhesive agent becomes a liquid flexible adhesive agent for pressing between two hard panel boards. Hence, the adhesive agent achieves self-balance flow that ensures equal distance between the two transparent panel board elements without creating any bubbles. In subsequent cooling and depressurizing processes, a transparent integrated body is formed by two transparent panel board elements adhered together by the adhesives, and in between the two adhered transparent panel board elements, the distance is uniform and the adhesives used therebetween will not overflow and do not contain any bubbles. After it is confirmed that there are no defects, the adhesives are solidified by illumination using a high power UV light. If, during bubble elimination process, the adhesives overflow to the outer side of the supporting frame, edges can be abraded and refined to prevent the adhesive from overflowing to the edge-lighting backlight module causing defects and possible uselessness of the edge-lighting backlight module.

The transparent integrated body made according to the technique disclosed by the present invention will not easily have bubbles inside, and the two panel board elements being adhered are spaced by the adhesives in a uniform distance without varied thickness of the adhesives. Therefore, the screen eventually manufactured will not have overflowed adhesives and will not contain any mura effect. The equipment to be used with the technique disclosed herein involves only a low cost. Therefore on one hand, the manufacturing cost can be significantly reduced, and on the other hand, the product yield rate significantly increases compared with the technique using liquid crystal UV adhesives.

Another object of the present invention is to alter the conventional structure of a LCD screen to solve the problems contained in such old structure. The present invention uses a sealed sandwich structure where the supporting frame is sandwiched by a glass rear cover panel and a screen protective glass/touch screen module; solid UV flexible adhesives are used as sealing agent to manufacture a fully sealed integrated LCD screen. The LCD screen is made according to the method described above. The LCD screen comprises a liquid crystal display screen body. The liquid crystal display screen body comprises a screen protective material being a touch screen module or a screen protective glass, a liquid crystal screen module, a supporting frame and a glass rear cover panel adhered in sequence by using solid UV flexible adhesives; an edge-lighting backlight module is embedded into the supporting frame; edges of the liquid crystal display screen body is coated with transparent sealer coating.

Further, the screen protective material being a touch screen module or a screen protective glass, the supporting frame and the glass rear cover panel are adhered in sequence; the liquid crystal screen module and the edge-lighting backlight module are embedded into the supporting frame; the liquid crystal screen module is adhered with the screen protective glass or the touch screen module.

Further, an indium tin oxide (ITO) electrically conductive film is plated onto a glass surface of the touch screen module and a surface of the glass rear cover panel; each ITO electrically conductive film is grounded to achieve shielding and anti-interference of the entire screen.

Further, an inner side of the glass rear cover panel is printed with white or black ink, so that the glass rear cover panel becomes a writing board.

Further, two sides of the liquid crystal display screen body are installed with rotating axes which are movably connected with a support rack. The screen can be freely flipped between a display screen or a writing board by means of the rotating axes supported at the two sides.

Further, the glass rear cover panel can guide light. The glass rear cover panel which can guide light can be treated as the light guiding panel of the edge-lighting backlight module; the glass rear cover panel which can guide light is embedded into the supporting frame and being adhered and fixed to the supporting frame; a bottom reflector sheet of the edge-lighting backlight module is printed or adhered to an outer side of the glass rear cover panel; an upper protective sheet, a prism sheet and a diffuser sheet of the edge-lighting backlight module are embedded in the supporting frame; one or two sides of the glass rear cover panel is/are provided with a light source on the supporting frame.

Further, the liquid crystal display screen body has an arc shape.

The super thin integrated touch screen which is fully sealed, water-proof and moisture-proof, made according to the technique of the present invention, eliminates all the gaps potentially existing between the screen protective glass/touch screen module, the liquid crystal screen module and the edge-lighting backlight module. On one hand, image clarity increases, and on the other hand, brightness can be reduced to achieve energy saving effect. Besides, heat dissipation is achieved through multiple channels like the touch screen glass in front of the touch screen module, the glass rear cover panel behind the touch screen module, and the supporting frame. Therefore, the heat dissipation rear cover panel and heat dissipation holes can be omitted, thereby completely eliminating the powder and dust inside the TV due to electrostatic adherence. Since the integrated screen of the present invention does not require metal parts such as a conventional metal frame for adhering a protective glass, a metal heat dissipation support rack for a solid liquid crystal glass, metal parts for fixing the edge-lighting backlight module, and a metal rear cover for heat dissipation and protection etc, metal materials can be saved, and the time and cost for a new product to be unloaded from a mould can be saved as well. More importantly, the thickness of the LCD screen can be reduced to 5 mm, thereby significantly reducing the weight of the product and lowering the manufacturing cost. The present invention can be vastly applied to TV, advertising device, electronic whiteboard, and supersize electronic display screen tec.

DETAILED DESCRIPTION OF THE INVENTION

Some preferred embodiments of the present invention are now described in detail below with reference to the figures.

Figure 1:
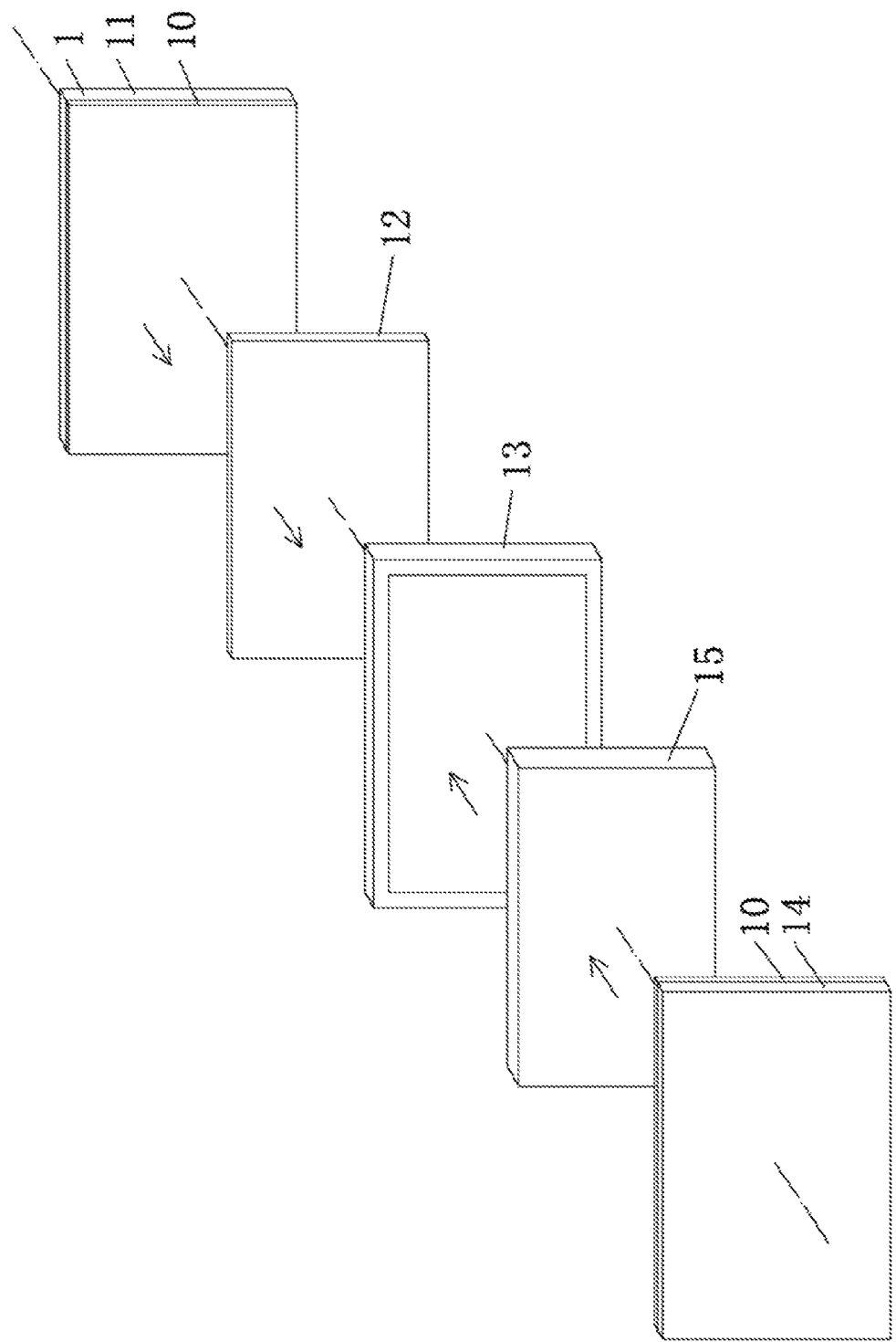
FIG. 1 is a structural diagram showing assembly of the various components of the integrated fully-sealed liquid crystal screen of the present invention.
Figure 2:
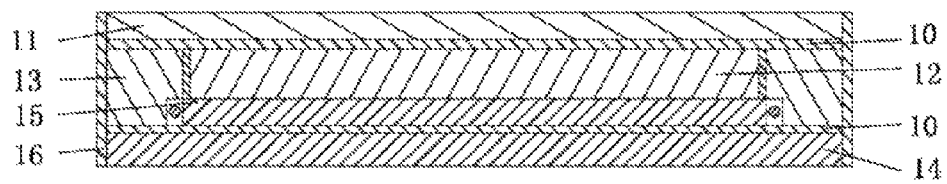
FIG. 2 is a sectional view of the integrated fully-sealed liquid crystal screen of the present invention.

As shown in FIGS. 1-2, the present invention provides an integrated fully-sealed liquid crystal screen, comprising a liquid crystal display screen body 1; the liquid crystal display screen body comprises a touch screen module 11, a supporting frame 13 and a glass rear cover panel 14 adhered together in sequence by using solid ultraviolet (UV) flexible adhesive 10; a liquid crystal screen module 12 and an edge-lighting backlight module 15 are embedded in the supporting frame 13; the liquid crystal screen module 12 is adhered to the touch screen module 11; edges of the liquid crystal display screen body 1 are applied with transparent sealer coating 16.

Embodiments of manufacturing an integrated fully-sealed liquid crystal touch screen which is also anti-interference are described as follows:

Embodiment 1:

A manufacturing method of an integrated fully-sealed liquid crystal screen, using solid UV flexible adhesives to adhere components that are arranged in sequence to form an integrated structure; said components comprise and are arranged in a sequence of a touch screen module 11, a supporting frame 13 and a glass rear cover panel 14; the method comprises the following steps:

1. Attaching solid UV flexible adhesives which form a thickness of 50-100 μm between every two adjacent components, and embedding a liquid crystal screen module 12 and an edge-lighting backlight module 15 in the supporting frame 13;

2. Eliminating bubbles: placing the components attached with the solid UV flexible adhesives into an autoclave for 10-50 mins to eliminate bubbles, and the pressure and temperature inside the autoclave should be maintained at 0.5-3 kg and 30-40° C. respectively.

3. Solidifying: illuminating the components attached with the solid UV flexible adhesives using a high power UV light to solidify the solid UV flexible adhesives in order to be adhered with the components;

4. Sealing edges: abrading and polishing edges of the integrated structure; coating the edges of the integrated structure with the transparent sealer coating; and then drying the integrated structure;

5. Screen shielding: after step 4, plating an indium tin oxide (ITO) electrically conductive film onto a surface of the touch screen module and a surface of the glass rear cover panel opposite to the touch screen module respectively, grounding each ITO electrically conductive film plated to the touch screen module and the glass rear cover panel respectively.

The components forming the integrated fully-sealed liquid crystal screen, the solid UV flexible adhesive, the transparent sealer coating, the autoclave used during the procedures, and equipment used for abrading and polishing in step 4 are all prior arts and therefore will not be described in detail herein.

Embodiments 2-3

Embodiments 2-3 are the same as embodiment 1, except that the figures concerning thickness, pressure and temperature in the procedures of attaching solid UV flexible adhesives in step 1 and eliminating bubbles in step 2, as given below in table 1, are different from the figures in embodiment 1, so that the integrated fully-sealed liquid crystal screen can be manufactured into different sizes.

TABLE 1

| Items | attaching solid UV flexible adhesives in step 1 solid UV flexible adhesives/μm | eliminating bubbles in step 2 | | | Screen Size/in |
|---|---|---|---|---|---|
| | | Autoclave Pressure/kg | Autoclave Temperature/ ° C. | Time in autoclave for bubble elimination/min | |
| Embodiment 1 | 50-100 | 0.5-3 | 30-40 | 10-50 | 40-55 |
| 2 | 90-150 | 2-5 | 35-50 | 48-100 | 46-70 |
| 3 | 150-300 | 8-10 | 48-65 | 120-250 | 65-84 |

In the above embodiments, the solid UV flexible adhesives do not have sufficient ability to flow if the thickness thereof is lower than 50 μm. As a result, the resulting solidified adhesives may have varied thicknesses. However, the ability to flow is more than sufficient if the thickness is greater than 300 μm. As a result, the adhesives may overflow. If the temperature and the pressure are lower than the set limits, it will not be easy to adhere the solid UV flexible adhesives with the various components. In the embodiments, the autoclave temperature during bubble elimination has a total range of 30-65° C., the autoclave pressure during bubble elimination has a total range of 0.5-10 kg, and the time in the autoclave for bubble elimination has a total range of 10-250 min. If these figures exceed their highest limits, resin will be easily softened, and thereby causing overflow of the adhesives as well as varied thicknesses of the adhesives and also mura effect. In actual manufacturing procedures, appropriate parameters taken from said ranges of figures as discussed above and presented in table 1 can be chosen according to a specific size of the screen intended to be manufactured.

In step 1, the solid UV flexible adhesives can be attached by using a film laminating machine or a film roll-coating machine. A multi-layer structure of components adhered by the solid UV flexible adhesives can be a two layer structure, or a structure more than two layers. Alternatively, the entire liquid crystal touch screen can be applied with the solid UV flexible adhesives to form an integrated adhered body, and that integrated adhered body is then put into the autoclave where it is pressurized, heated and subject to bubble elimination to form a super thin multi-layered glass panel body which is transparent, sealed, anti-interference, water-proof, anti-fogging, and which can dissipate heat naturally. Besides, the liquid crystal screen module can also be directly adhered to an outer surface of the supporting frame.

An inner side of the glass rear cover panel can be printed with white or black ink. Two sides of the liquid crystal display screen body are installed with rotating axes which are movably connected with a support rack to form a rotatable screen.

The edge-lighting backlight module can be installed according to another method not described in the above embodiments. Specifically, parts making up the edge-lighting backlight module can be separately installed: a bottom reflector sheet and a light guiding panel of the edge-lighting backlight module are adhered to the inner side of the glass rear cover panel by using solid UV flexible adhesives, and then the glass rear cover panel is adhered to the supporting frame; an upper protective sheet, a prism sheet and a diffuser sheet of the edge-lighting backlight module are directly embedded in the supporting frame.

Figure 3:
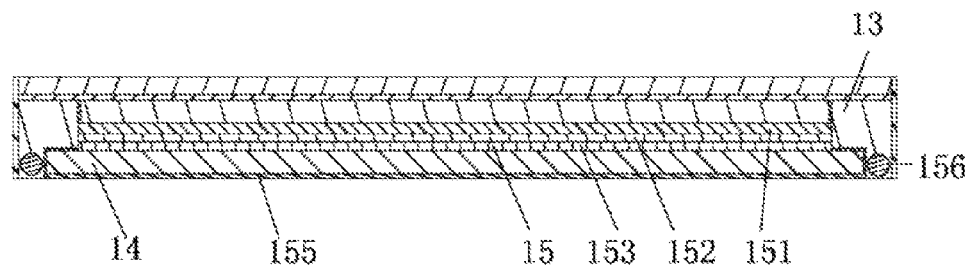
FIG. 3 shows a light guiding panel of an edge-lighting backlight module in the integrated fully-sealed liquid crystal screen of the present invention, where the light guiding panel is a glass rear cover panel which can guide light.

As shown in FIG. 3, the glass rear cover panel 14 which can guide light can be treated as the light guiding panel of the edge-lighting backlight module; the bottom reflector sheet 155 of the edge-lighting backlight module is printed or adhered to an outer side of the glass rear cover panel 14; the glass rear cover panel 14 which can guide light, the upper protective sheet 151, the prism sheet 152 and the diffuser sheet 153 of the edge-lighting backlight module are directly embedded in the supporting frame and are adhered and fixed to the supporting frame; one or two sides of the glass rear cover panel 14 is/are provided with a light source 156 on the supporting frame, such that the screen becomes even lighter and thinner after reducing the thickness constituted by the original acryl light guiding panel.

The finishing products manufactured according to the embodiments are fully-sealed liquid crystal touch screens. In actual practice, the touch screen module can be replaced by a screen protective glass so that an integrated liquid crystal non-touch screen can be manufactured. A transparent ITO electrically conductive film can be plated onto a glass surface of the touch screen module and a surface of the waterproof glass rear cover panel respectively; each transparent ITO electrically conductive film is grounded.

The above description is only intended to illustrate the embodiments of the present invention, but does not intend to limit the scope of the present invention. Procedural changes made in accordance with the teachings of the present invention achieving the same technical effect, or direct or indirect applications of the present invention to other related technical fields should also fall within the scope of protection of the present invention.

What is claimed is:

1. A manufacturing method of an integrated fully-sealed liquid crystal screen, wherein the method comprises using solid UV flexible adhesives to adhere components that are arranged in sequence to form an integrated structure; said components comprise and are arranged in a sequence of a screen protective material being a touch screen module or a screen protective glass, a liquid crystal screen module, a supporting frame and a glass rear cover panel; the method comprises the following steps:
   1) preliminary attaching: attaching solid UV flexible adhesives which form a thickness of 50-300 μm between every two adjacent components, and embedding an edge-lighting backlight module in the supporting frame;
   2) eliminating bubbles: placing the components attached with the solid UV flexible adhesives into an autoclave for 10-250 mins to eliminate bubbles, with pressure and temperature inside the autoclave maintained at 0.5-10 kg and 30-65° C. respectively;
3) solidifying: illuminating the components attached by the solid UV flexible adhesives using a high power UV light to solidify the solid UV flexible adhesives in order to be adhered with the components to form the integrated structure;
4) sealing edges: abrading and polishing edges of the integrated structure; coating the edges of the integrated structure with transparent sealer coating; and then drying the integrated structure.

2. The manufacturing method as in claim 1, wherein the supporting frame is made of organic panel glass, antioxidant resin board or metal board.

3. The manufacturing method as in claim 1, wherein said step 1 also comprises:
adhering a bottom reflector sheet and a light guiding panel of the edge-lighting backlight module to an inner side of the glass rear cover panel by using the solid UV flexible adhesives; providing a light source at one or two sides of the light guiding panel; and then adhering the glass rear cover panel to the supporting frame; embedding an upper protective sheet, a prism sheet and a diffuser sheet of the edge-lighting backlight module in the supporting frame.

4. The manufacturing method as in claim 1, wherein the supporting frame has an arc shape; the touch screen module, the liquid crystal screen module, the edge-lighting backlight module and the glass rear cover panel are flexible; said step 1 also comprises:
attaching the touch screen module with the liquid crystal screen module and the glass rear cover panel with the edge-lighting backlight module, and then embedding the liquid crystal screen module which is behind the touch screen module and the edge-lighting backlight module which is positioned in front of the glass rear cover panel into the supporting frame which has an arc shape, so that the components are attached to form an overall arc shape.

5. The manufacturing method as in claim 4, wherein the glass rear cover panel is capable of guiding light; the glass rear cover panel which is capable of guiding light is treated as the light guiding panel of the edge-lighting backlight module; the glass rear cover panel which is capable of guiding light is embedded into the supporting frame and being adhered and fixed to the supporting frame; one or two sides of the glass rear cover panel is/are provided with a light source on the supporting frame; the bottom reflector sheet of the edge-lighting backlight module is printed or adhered to an outer side of the glass rear cover panel.

6. The manufacturing method as in claim 1, wherein the glass rear cover panel is capable of guiding light; the glass rear cover panel which is capable of guiding light is treated as the light guiding panel of the edge-lighting backlight module; the glass rear cover panel which is capable of guiding light is embedded into the supporting frame and being adhered and fixed to the supporting frame; one or two sides of the glass rear cover panel is/are provided with a light source on the supporting frame; the bottom reflector sheet of the edge-lighting backlight module is printed or adhered to an outer side of the glass rear cover panel.

7. An integrated fully-sealed liquid crystal screen manufactured according to the manufacturing method of claim 1, comprising a liquid crystal display screen body; wherein the liquid crystal display screen body comprises a screen protective material being a touch screen module or a screen protective glass, a liquid crystal screen module, a supporting frame and a glass rear cover panel adhered in sequence by using solid UV flexible adhesives; an edge-lighting backlight module is embedded into the supporting frame; edges of the liquid crystal display screen body are coated with transparent sealer coating.

8. The integrated fully-sealed liquid crystal screen as in claim 7, wherein the screen protective material being the touch screen module or the screen protective glass, the supporting frame and the glass rear cover panel are adhered in sequence; the liquid crystal screen module and the edge-lighting backlight module are embedded into the supporting frame; the liquid crystal screen module is adhered with the screen protective glass or the touch screen module.

9. The integrated fully-sealed liquid crystal screen as in claim 7, wherein an indium tin oxide (ITO) electrically conductive film is plated onto a glass surface of the touch screen module and a surface of the glass rear cover panel respectively; each ITO electrically conductive film is grounded.

10. The integrated fully-sealed liquid crystal screen as in claim 9, wherein two sides of the liquid crystal display screen body are installed with rotating axes which are movably connected with a support rack.

11. The integrated fully-sealed liquid crystal screen as in claim 7, wherein an inner side of the glass rear cover panel is printed with white or black ink.

12. The integrated fully-sealed liquid crystal screen as in claim 7, wherein the glass rear cover panel is capable of guiding light; the glass rear cover panel which is capable of guiding light is treated as a light guiding panel of the edge-lighting backlight module; the glass rear cover panel which is capable of guiding light is embedded into the supporting frame and being adhered and fixed to the supporting frame; a bottom reflector sheet of the edge-lighting backlight module is printed or adhered to an outer side of the glass rear cover panel; an upper protective sheet, a prism sheet and a diffuser sheet of the edge-lighting backlight module are embedded in the supporting frame; one or two sides of the glass rear cover panel is/are provided with a light source on the supporting frame.

13. The integrated fully-sealed liquid crystal screen as in claim 12, wherein the liquid crystal display screen body has an arc shape.

14. The integrated fully-sealed liquid crystal screen as in claim 7, wherein the liquid crystal display screen body has an arc shape.

* * * * *